United States Patent
Kobayashi et al.

(10) Patent No.: US 9,368,826 B2
(45) Date of Patent: Jun. 14, 2016

(54) FUEL CELL STACK

(71) Applicant: HONDA MOTOR CO., LTD., Tokyo (JP)

(72) Inventors: Tsuyoshi Kobayashi, Wako (JP); Kimiharu Mizusaki, Wako (JP); Takashi Kuwayama, Wako (JP); Hiroaki Ohta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 212 days.

(21) Appl. No.: 14/168,004

(22) Filed: Jan. 30, 2014

(65) Prior Publication Data
US 2014/0212785 A1   Jul. 31, 2014

(30) Foreign Application Priority Data
Jan. 31, 2013   (JP) .................................. 2013-016912

(51) Int. Cl.
H01M 2/20 (2006.01)
H01M 8/24 (2016.01)
H01M 8/04 (2016.01)

(52) U.S. Cl.
CPC ........ *H01M 8/2465* (2013.01); *H01M 8/04067* (2013.01); *Y02E 60/50* (2013.01)

(58) Field of Classification Search
CPC . H01M 8/04067; H01M 8/2465; Y02E 60/50
See application file for complete search history.

(56) References Cited

U.S. PATENT DOCUMENTS

| 2002/0022173 A1* | 2/2002 | Molter ...................... C25B 9/20 429/458 |
| 2013/0171545 A1* | 7/2013 | Betts ................... H01M 8/0276 429/508 |
| 2013/0230785 A1* | 9/2013 | Terada .............. H01M 8/04007 429/434 |

FOREIGN PATENT DOCUMENTS

| JP | 08-88018 | 4/1996 |
| JP | 4494830 B2 | 9/2005 |

* cited by examiner

*Primary Examiner* — Mark F Huff
*Assistant Examiner* — Monique Wills
(74) *Attorney, Agent, or Firm* — Mori & Ward, LLP

(57) ABSTRACT

A fuel cell stack includes a stacked body, insulators, end plates, heat insulating members, and terminal plates. In the stacked body, a plurality of power generation cells are stacked in a stacking direction. Each of the plurality of power generation cells includes a separator and an electrolyte electrode assembly which includes an electrolyte and a pair of electrodes sandwiching the electrolyte therebetween. The stacked body has a first end portion and a second end portion opposite to the first end portion in the stacking direction. The insulators are provided at the first end portion and the second end portion of the stacked body, respectively. Each of the insulators has a recessed portion that faces toward the stacked body. The end plates are provided on the insulators, respectively. The heat insulating members are each provided in the recessed portion. The terminal plates are each provided in the recessed portion.

12 Claims, 6 Drawing Sheets

FIG. 3
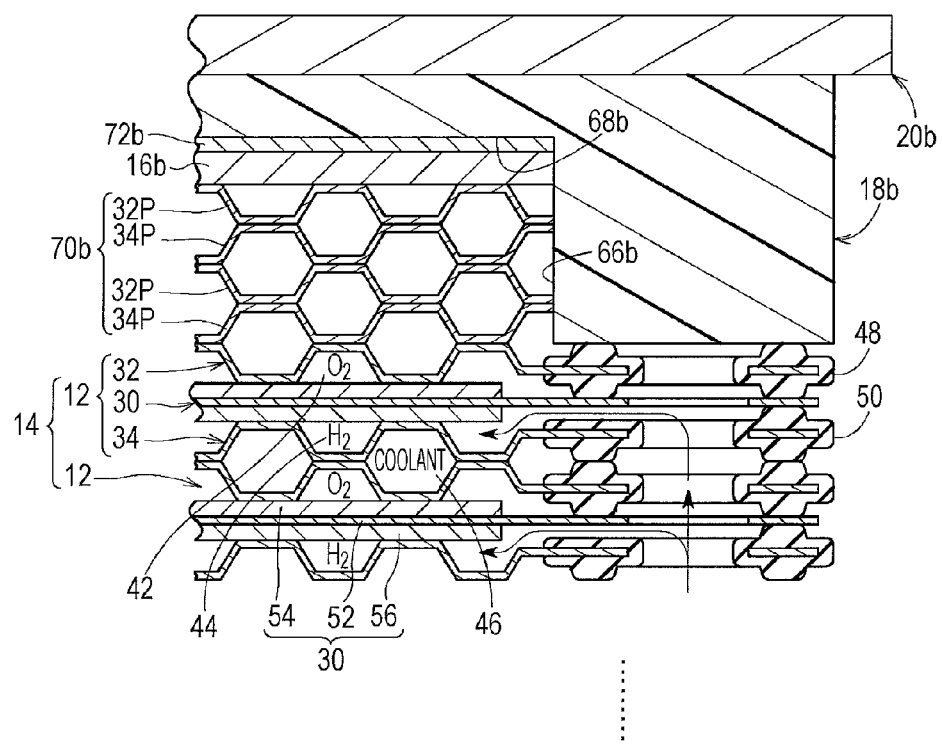
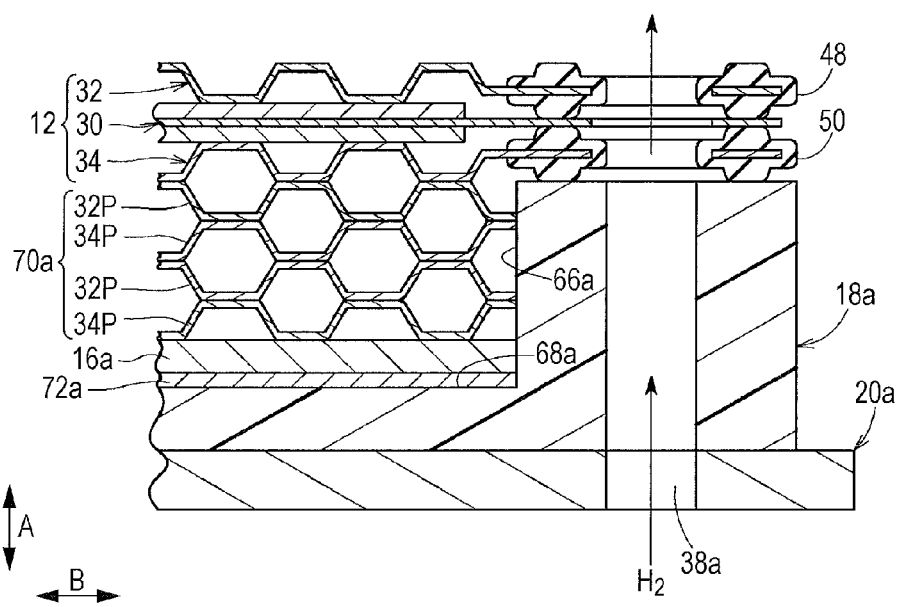

FIG. 5
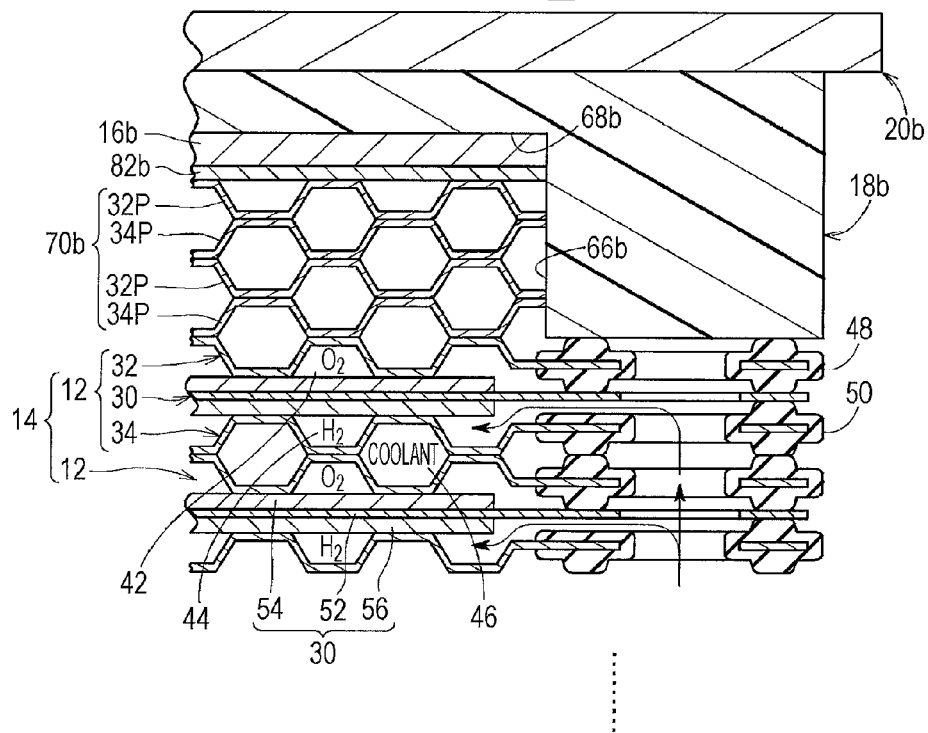
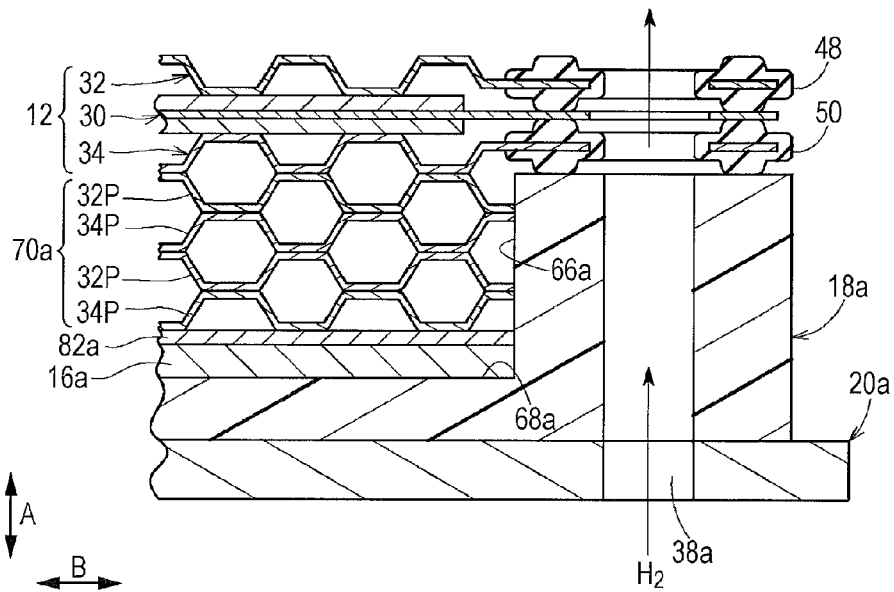

FIG. 6
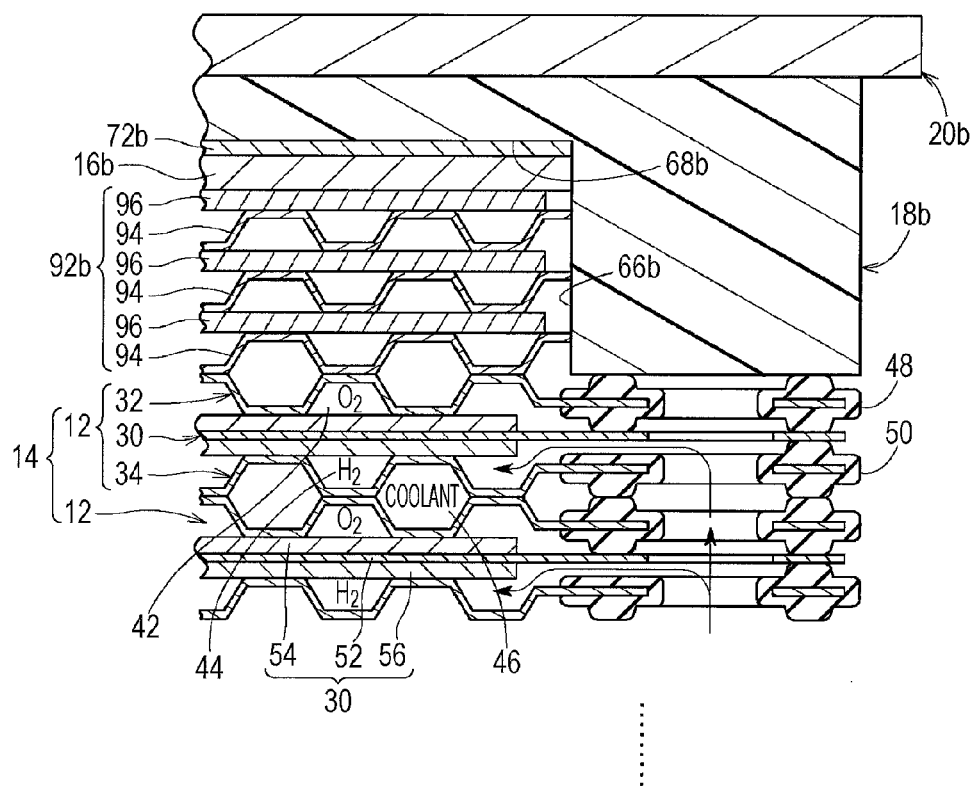
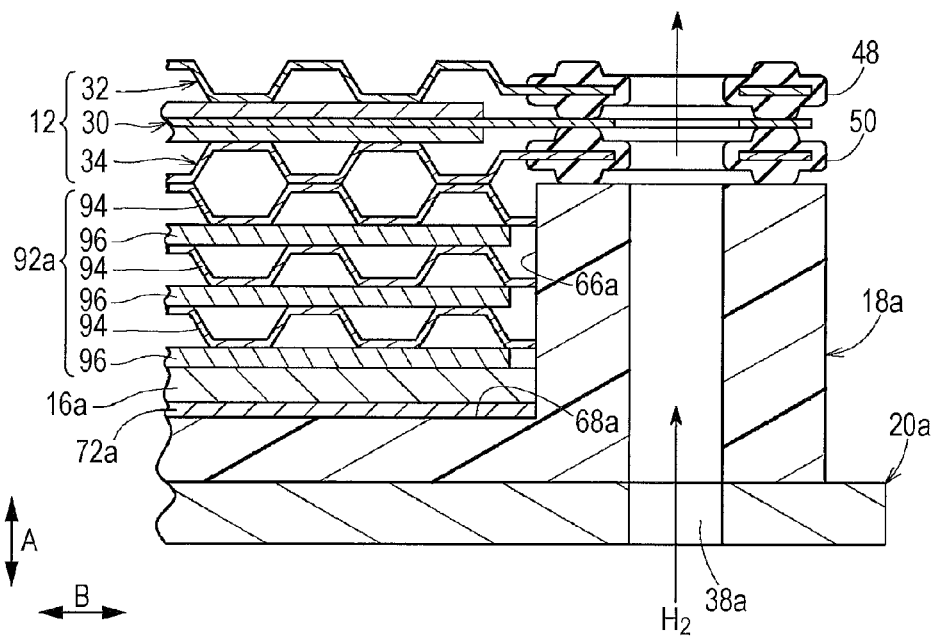

FUEL CELL STACK

CROSS-REFERENCE TO RELATED APPLICATIONS

The present application claims priority under 35 U.S.C. §119 to Japanese Patent Application No. 2013-016912, filed Jan. 31, 2013, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a solid polymer electrolyte membrane that is made from a solid polymer ion-exchange membrane. A power generation cell of this type includes a membrane electrode assembly (MEA) and a pair of separators (bipolar plates) sandwiching the MEA therebetween. The MEA includes a solid polymer electrolyte membrane and an anode electrode and a cathode electrode sandwiching the solid polymer electrolyte membrane therebetween. Each of the anode electrode and the cathode electrode includes an electrode catalyst (electrode catalyst layer) and porous carbon (gas diffusion layer). A predetermined number of such power generation cells are stacked so as to form a fuel cell stack, which is used, for example, as an automobile fuel cell stack.

In order to obtain a desired power, fuel cells are usually used in the form of a fuel cell stack in which a predetermined number (for example, several tens to several hundreds) of power generation cells are stacked. In the fuel cell stack, it is necessary to press the stacked power generation cells against each other in order to suppress an increase in the internal resistance of the power generation cells and a reduction in the sealability against a reactant gas.

Each of the power generation cells includes a power generation portion located in its central part and a manifold portion, for sealing manifolds, located in its peripheral part. The optimal clamp load to be applied to the power generation portion differs from the optimal clamp load to be applied to the manifold portion.

Japanese Patent No. 4494830, for example, describes a fuel cell stack that can reliably apply a desired load to each of a power generation portion and a manifold portion of each of power generation cells with a simple and economical structure.

The fuel cell stack includes an insulating spacer and a terminal member that are disposed at least at one end of the power generation cells in a stacking direction. The insulating spacer is disposed in direct contact with an end plate of a box-shaped casing, and applies a load to the manifold portion. The terminal member is disposed inside of the insulating spacer, and applies a load to the power generation portion. The terminal member is disposed in a recessed portion that is formed in a central part of the insulating spacer. A load applied to the power generation portion or to the manifold portion is adjusted by adjusting the thickness of the terminal member.

SUMMARY

According to one aspect of the present invention, a fuel cell stack includes a stacked body in which a plurality of power generation cells are stacked in a stacking direction, insulators, end plates, heat insulating members, terminal plates, and shim members. Each of the plurality of power generation cells includes a separator and an electrolyte electrode assembly which includes an electrolyte and a pair of electrodes sandwiching the electrolyte therebetween. The stacked body has a first end portion and a second end portion opposite to the first end portion in the stacking direction. The insulators are provided at the first end portion and the second end portion of the stacked body, respectively. Each of the insulators has a recessed portion that faces toward the stacked body. The end plates are provided on the insulators, respectively. The heat insulating members are each provided in the recessed portion. The terminal plates are each provided in the recessed portion. The shim members are each provided in the recessed portion for thickness adjustment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a sectional view of the fuel cell stack taken along line III-III of FIG. 2.

FIG. 5 is a partial sectional view of a fuel cell stack according to a second embodiment of the present disclosure.

FIG. 6 is a partial sectional view of a fuel cell stack according to a third embodiment of the present disclosure.

DESCRIPTION OF THE EMBODIMENTS

Figure 1:
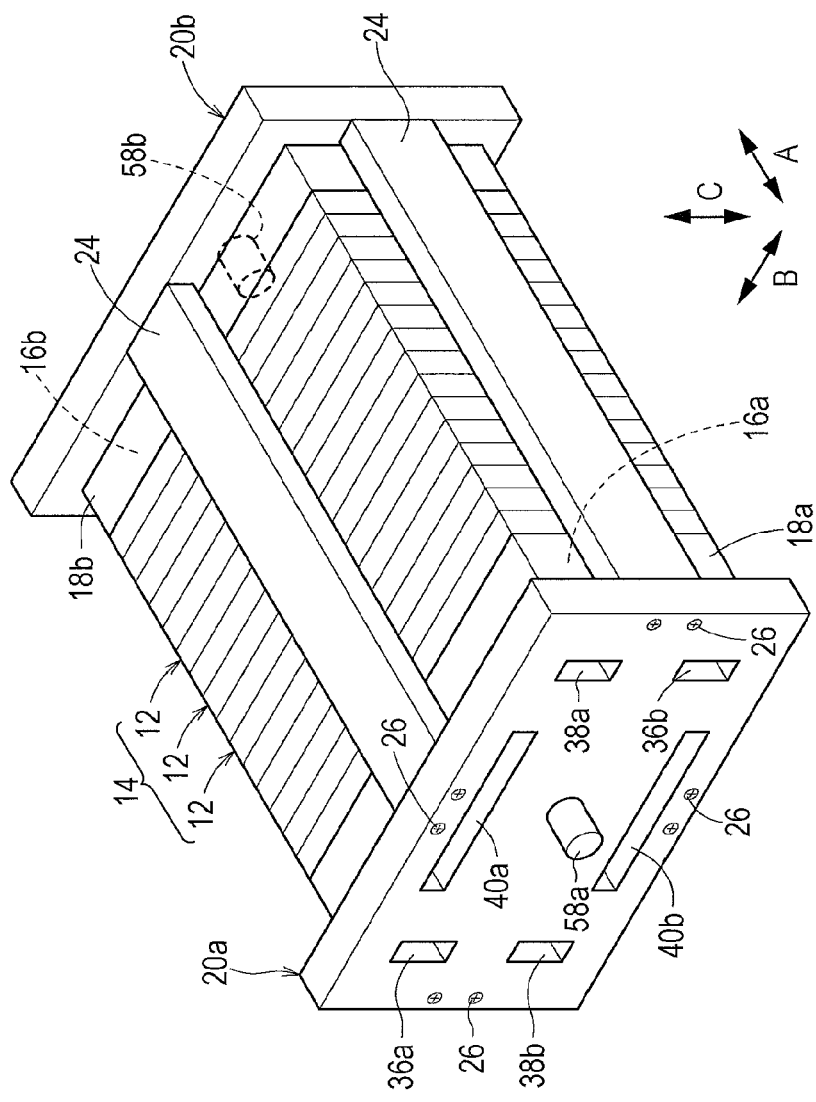
FIG. 1 is a perspective view of a fuel cell stack according to a first embodiment of the present disclosure.

The embodiments will now be described with reference to the accompanying drawings, wherein like reference numerals designate corresponding or identical elements throughout the various drawings.

Figure 2:
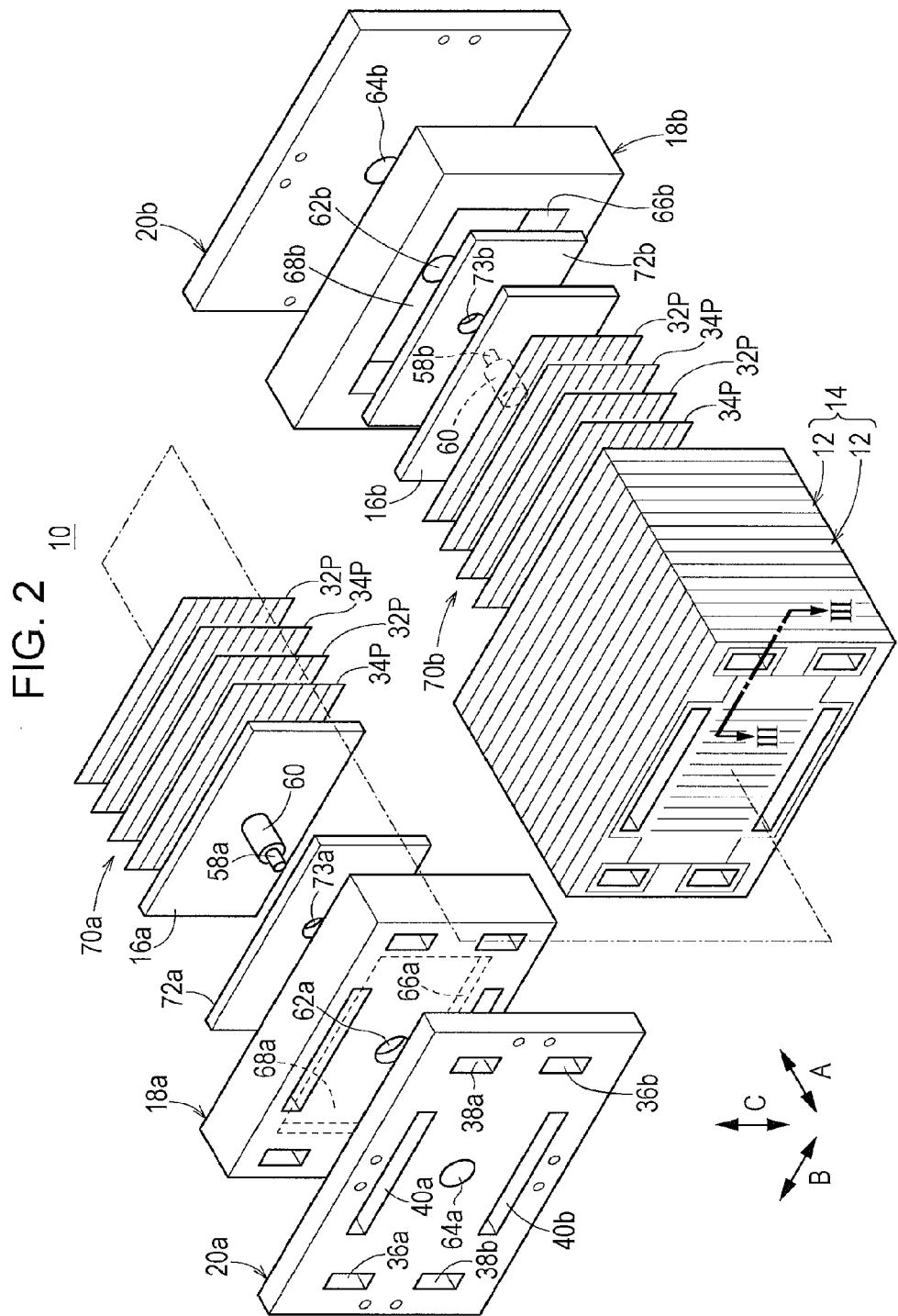
FIG. 2 is a partially exploded perspective view of the fuel cell stack.

As illustrated in FIGS. 1 and 2, a fuel cell stack 10 according to a first embodiment of the present disclosure includes a stacked body 14 in which a plurality of power generation cells 12 are stacked in a horizontal direction (direction of arrow A). At one end of the stacked body 14 in the stacking direction (direction of arrow A), a terminal plate 16a, an insulator 18a (insulating plate), and an end plate 20a are arranged in this order toward the outside (see FIG. 2). At the other end of the stacked body 14 in the stacking direction, a terminal plate 16b, an insulator 18b (insulating plate), and an end plate 20b are arranged in this order toward the outside.

As illustrated in FIG. 1, the end plates 20a and 20b have horizontal rectangular shapes (or vertical rectangular shapes). Connection bars 24 are disposed between corresponding sides of the end plates 20a and 20b. Ends of the connection bars 24 are fixed to inner surfaces of the end plates 20a and 20b by using bolts 26, so that a fastening load is applied to the stack of the power generation cells 12 in the stacking direction (direction of arrow A). The fuel cell stack 10 may include a casing having the end plates 20a and 20b as its end panels, and the stacked body 14 may be disposed in the casing.

Figure 4:
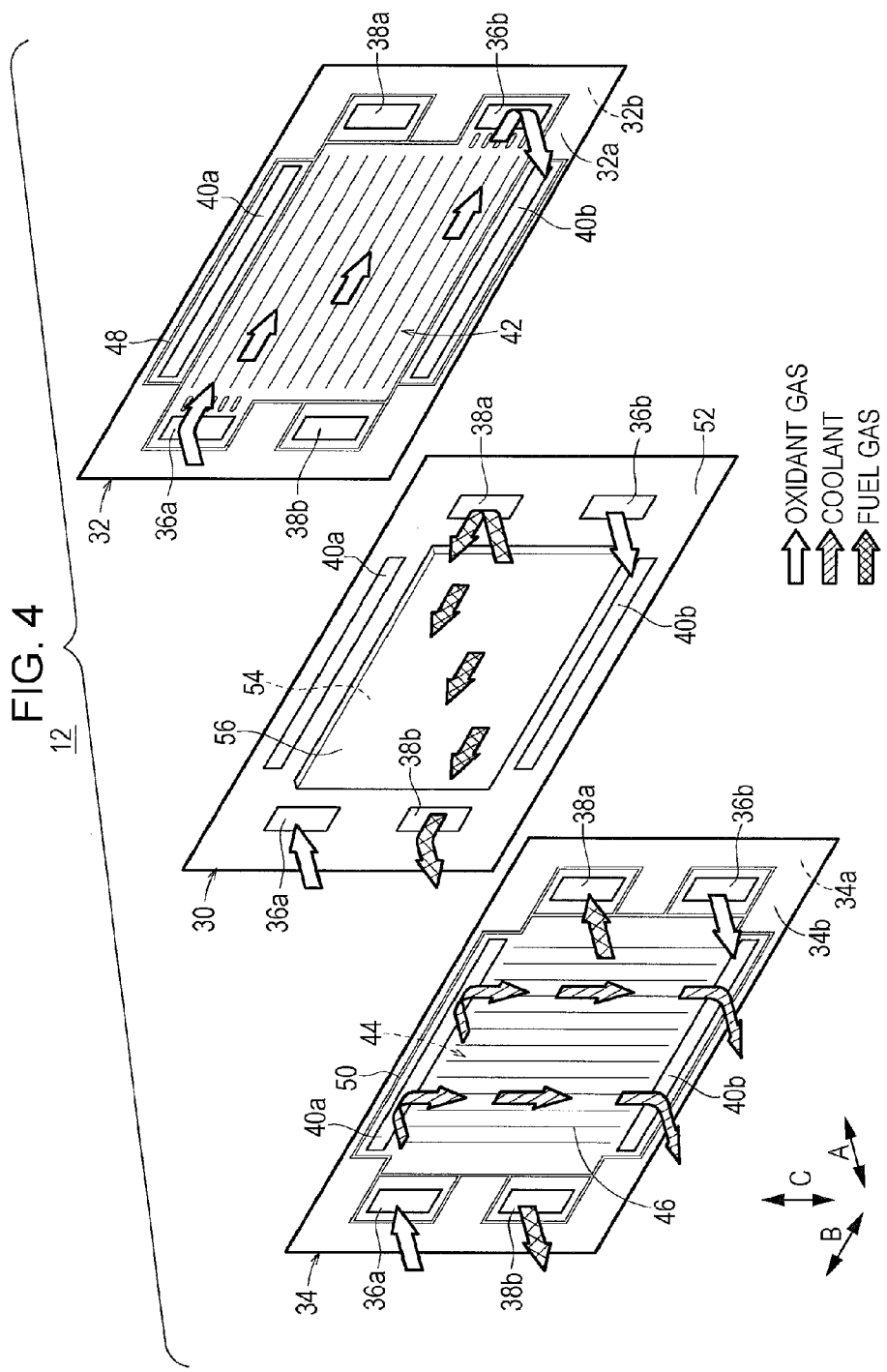
FIG. 4 is an exploded perspective view of a power generation cell of the fuel cell stack.

As illustrated in FIGS. 3 and 4, the power generation cell 12 includes a membrane electrode assembly 30, and a first separator 32 and a second separator 34 sandwiching the membrane electrode assembly 30 therebetween. The first separator 32 and the second separator 34 are metal separators each made from a thin metal plate, such as a steel plate, a stainless steel plate, an aluminum plate, a galvanized steel plate, or any of such thin metal plates having an anti-corrosive coating on the surface thereof. The separators 32 and 34 are formed by press-forming the thin metal plates so as to have corrugated cross-sectional shapes. Alternatively, the separators 32 and 34 may be, for example, carbon separators.

An oxidant gas inlet manifold 36a and a fuel gas outlet manifold 38b are formed in the power generation cell 12 so as to extend in the direction of arrow A through one end portion of the power generation cell 12 in the direction of arrow B (horizontal direction in FIG. 4). The manifolds 36a and 38b are arranged in the direction of arrow C (vertical direction). An oxidant gas, such as an oxygen-containing gas, is supplied through the oxidant gas inlet manifold 36a. A fuel gas, such as a hydrogen-containing gas, is discharged through the fuel gas outlet manifold 38b.

A fuel gas inlet manifold 38a and an oxidant gas outlet manifold 36b are formed in the power generation cell 12 so as to extend in the direction of arrow A through the other end portion of the power generation cell 12 in the direction of arrow B. The manifolds 38a and 36b are arranged in the direction of arrow C. The fuel gas is supplied through the fuel gas inlet manifold 38a. The oxidant gas is discharged through the oxidant gas outlet manifold 36b.

A coolant inlet manifold 40a is formed in an upper end portion of the power generation cell 12 in the direction of arrow C. A coolant is supplied through the coolant inlet manifolds 40a. A coolant outlet manifold 40b is formed in a lower end portion of the power generation cell 12 in the direction of arrow C. The coolant is discharged through the coolant outlet manifolds 40b.

An oxidant gas channel 42, through which the oxidant gas inlet manifold 36a is connected to the oxidant gas outlet manifold 36b, is formed on a surface 32a of the first separator 32 facing the membrane electrode assembly 30. The oxidant gas channel 42 includes a plurality of channel grooves extending in the horizontal direction (direction of arrow B).

A fuel gas channel 44, through which the fuel gas inlet manifold 38a is connected to the fuel gas outlet manifold 38b, is formed on a surface 34a of the second separator 34 facing the membrane electrode assembly 30. The fuel gas channel 44 includes a plurality of channel grooves extending in the horizontal direction (direction of arrow B).

A coolant channel 46, through which the coolant inlet manifold 40a is connected to the coolant outlet manifold 40b, is formed between a surface 32b of the first separator 32 of the power generation cell 12 and a surface 34b of the second separator 34 of an adjacent power generation cell 12.

Sealing members 48 and 50 are integrally or independently provided on the first separator 32 and the second separator 34. Each of the sealing members 48 and 50 is made from an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

The membrane electrode assembly 30 includes a solid polymer electrolyte membrane 52, and a cathode electrode 54 and an anode electrode 56 sandwiching the solid polymer electrolyte membrane 52 therebetween. The solid polymer electrolyte membrane 52 is, for example, a thin film that is made of a perfluorosulfonate polymer and that is impregnated with water.

The solid polymer electrolyte membrane 52 has planar dimensions that are greater than those of the cathode electrode 54 and the anode electrode 56. The membrane electrode assembly 30 may be a stepped MEA, in which the cathode electrode 54 and the anode electrode 56 have different planar dimensions.

The cathode electrode 54 and the anode electrode 56 each include a gas diffusion layer and an electrode catalyst layer. The gas diffusion layer is made of carbon paper or the like. The electrode catalyst layer is formed on a surface of the gas diffusion layer by uniformly coating the surface with porous carbon particles whose surfaces support a platinum alloy. The electrode catalyst layers are disposed on both sides of the solid polymer electrolyte membrane 52.

As illustrated in FIG. 2, terminal portions 58a and 58b are respectively disposed at substantially the centers of the terminal plates 16a and 16b. The terminal portions 58a and 58b extend outward in the stacking direction. The terminal portions 58a and 58b are each disposed in an insulating cylindrical body 60. The terminal portions 58a and 58b respectively extend through holes 73a and 73b in shim members 72a and 72b (described below), holes 62a and 62b in the insulators 18a and 18b, and holes 64a and 64b in the end plates 20a and 20b; and protrude to the outside of the end plates 20a and 20b.

The insulators 18a and 18b are each made of an insulating material, such as a polycarbonate (PC) or a phenol resin. Recesses 66a and 66b are respectively formed in central parts of the insulators 18a and 18b. The recessed portions 66a and 66b are open toward the stacked body 14. The holes 62a and 62b respectively extend through substantially central parts of bottom surfaces 68a and 68b of the recessed portions 66a and 66b.

As illustrated in FIGS. 2 and 3, a heat insulating member 70a, the terminal plate 16a, and the shim member 72a for thickness adjustment are disposed in the recessed portion 66a. The shim member 72a has a predetermined thickness. The shim member 72a is disposed on the bottom surface 68a of the recessed portion 66a. A heat insulating member 70b, the terminal plate 16b, and the shim member 72b for thickness adjustment are disposed in the recessed portion 66b. The shim member 72b is disposed on the bottom surface 68b of the recessed portion 66b.

The shim members 72a and 72b are each made of, for example, a polyphenylene sulfide (PPS), a stainless steel (SUS), aluminum, copper, or the like. In the first embodiment, it is preferable that the shim members 72a and 72b be made of an electrically insulating material or a material that is covered with an electrically insulating coating.

The heat insulating member 70a includes corrugated metal plates 32P and corrugated metal plates 34P that are alternately stacked on top of each other. Each of the corrugated metal plates 32P is made by cutting off an outer frame portion of the first separator 32 of the power generation cell 12 (stacked body 14). Each of the corrugated metal plates 34P is made by cutting off an outer frame portion of the second separator 34. In this example, two sets of the corrugated metal plates 32P and 34P are used. In the heat insulating member 70a, heat insulating spaces are formed between the plates 32P and 34P that are in contact with each other. The dimensions of outer peripheries of the plates 32P and 34P are the same as the dimensions of the inner peripheries of the insulator 18a.

In a case where the power generation cell 12 includes three separators of different types, the three separators may be alternately stacked. The heat insulating member 70a may include one set of the plates 32P and 34P or three or more sets of the plates 32P and 34P. The heat insulating member 70a may include only the plates 32P that are stacked or only the plates 34P that are stacked. It is not necessary that metal separators used in the power generation cell be used as the plates 32P or 34P. Instead, metal separators specifically prepared for end portions may be used as the plates 32P or 34P.

The heat insulating member 70a may be made from any appropriate material having air holes therein and having electrical conductivity, such as an electrically conductive metal foam, a honeycomb metal (honeycomb member), or porous carbon (for example, carbon paper). A single heat insulating member 70a or a stack of heat insulating members 70a may be used. The structure of the heat insulating member 70b is the same as that of the heat insulating member 70a. The same components will be denoted by the same numerals and the detailed description of such components will be omitted.

As illustrated in FIG. 3, the sealing member 50 of the second separator 34 that is disposed at an end of the stacked body 14 on the insulator 18a side in the stacking direction is in contact with a frame-shaped end surface of the insulator 18a. The sealing member 48 of the first separator 32 that is disposed at an end of the stacked body 14 on the insulator 18b side in the stacking direction is in contact with a frame-shaped end surface of the insulator 18b.

The operation of the fuel cell stack 10 will be described below.

First, as illustrated in FIG. 1, an oxidant gas, such as an oxygen-containing gas, is supplied to the oxidant gas inlet manifold 36a of the end plate 20a. A fuel gas, such as a hydrogen-containing gas, is supplied to the fuel gas inlet manifold 38a of the end plate 20a. A coolant, such as pure water, ethylene glycol, an oil, or the like, is supplied to the coolant inlet manifold 40a of the end plate 20a.

As illustrated in FIG. 4, the oxidant gas is introduced from the oxidant gas inlet manifold 36a into the oxidant gas channel 42 of the first separator 32. The oxidant gas moves along the oxidant gas channel 42 in the horizontal direction (the direction of arrow B), and is supplied to the cathode electrode 54 of the membrane electrode assembly 30.

The fuel gas is supplied from the fuel gas inlet manifold 38a to the fuel gas channel 44 of the second separator 34. The fuel gas moves along the fuel gas channel 44 in the horizontal direction (direction of arrow B), and is supplied to the anode electrode 56 of the membrane electrode assembly 30.

Accordingly, in the membrane electrode assembly 30, the oxidant gas supplied to the cathode electrode 54 and the fuel gas supplied to the anode electrode 56 are consumed in electrochemical reactions in the electrode catalyst layers, and thereby electric power is generated.

Next, the oxidant gas, which has been supplied to the cathode electrode 54 and consumed, is discharged along the oxidant gas outlet manifold 36b in the direction of arrow A. The fuel gas, which has been supplied to the anode electrode 56 and consumed, is discharged along the fuel gas outlet manifold 38b in the direction of arrow A.

The coolant supplied to the coolant inlet manifold 40a is introduced into the coolant channel 46 between the first separator 32 and the second separator 34, and then flows in the direction of arrow C. The coolant cools the membrane electrode assembly 30, and then is discharged from the coolant outlet manifold 40b.

In the first embodiment, as illustrated in FIG. 3, the heat insulating member 70a and the terminal plate 16a are disposed in the recessed portion 66a of the insulator 18a. The heat insulating member 70b and the terminal plate 16b are disposed in the recessed portion 66b of the insulator 18b.

Therefore, dissipation of heat from the outer peripheries of the heat insulating members 70a and 70b and the terminal plates 16a and 16b can be effectively suppressed. Accordingly, it is possible to reliably suppress a decrease in the temperatures of the power generation cells 12 (end cells) that are disposed at ends of the stacked body 14.

Moreover, the shim members 72a and 72b for thickness adjustment are respectively disposed in the recessed portions 66a and 66b of the insulators 18a and 18b. Thus, the tolerances of the steps of the insulators 18a and 18b can be adjusted, and therefore it is possible to limit the heights of sealing members of the second separator 34 and the first separator 32 of the end cells to appropriate heights. Therefore, the sealing members 50 and 48 can be prevented from falling over or being compressed excessively, so that it is possible to obtain a desired sealability.

Accordingly, the first embodiment have the following advantages: a decrease in the temperatures of the power generation cells 12 disposed at end portions can be suppressed, and thereby good power generation performance can be maintained; and it is possible to apply an optimal surface pressure to each of the outer periphery and a power generation portion (in which the electrode catalyst layers of the cathode electrode 54 and the anode electrode 56 overlap in the stacking direction) of the power generation cell 12.

FIG. 5 illustrates a fuel cell stack 80 according to a second embodiment of the present disclosure. The components of the fuel cell stack 80 the same as those of the fuel cell stack 10 according to the first embodiment will be denoted by the same numerals and the detailed description of such components will be omitted. Likewise, the detailed description of such components of a third embodiment described below will be omitted.

The fuel cell stack 80 includes shim members 82a and 82b, instead of the shim members 72a and 72b. The shim member 82a is disposed at a position at one end of the heat insulating member 70a, such as a position between the heat insulating member 70a and the terminal plate 16a. The shim member 82b is disposed at a position at one end of the heat insulating member 70b, such as a position between the heat insulating member 70b and the terminal plate 16b. The shim members 82a and 82b are each made of copper, aluminum, or a stainless steel. The shim members 82a and 82b are electrically conductive, so that the heat insulating members 70a and 70b are electrically connected to the terminal plates 16a and 16b, respectively.

The shim member 82a may be disposed at a position at the other end of the heat insulating member 70a, such as a position between the heat insulating member 70a and the second separator 34 of the power generation cell 12. The shim member 82a may be disposed at a position in the heat insulating member 70a, such as a position between the plates 32P and 34P. The same applies to the shim member 82b.

With the second embodiment, the sealing members 50 and 48 are prevented from falling over or being compressed excessively, so that the effects the same as those of the first embodiment can be obtained. That is, for example, it is possible to apply an optimal surface pressure to each of the outer periphery and the power generation portion of the power generation cell 12 with a simple structure.

FIG. 6 illustrates a fuel cell stack 90 according to the third embodiment of the present disclosure.

The fuel cell stack 90 includes heat insulating members 92a and 92b, instead of the heat insulating members 70a and 70b. The heat insulating members 92a and 92b each include first heat insulating members 94 and second heat insulating members 96, which are made of different materials and which are alternately stacked on top of each other.

Each of the first heat insulating members 94 is made from, for example, a metal plate, and may be the same as one of the plates 32P and 34P. Each of the second heat insulating members 96 may be any appropriate member that is thermally insulating, and may be, for example, a carbon plate. The dimensions of the second heat insulating member 96 are smaller than those of the first heat insulating member 94.

The heat insulating member 92a, the terminal plate 16a, and the shim member 72a are disposed in the recessed portion 66a of the insulator 18a. The shim member 72a is disposed on the bottom surface 68a. The heat insulating member 92b, the terminal plate 16b, and the shim member 72b are disposed in the recessed portion 66b of the insulator 18b. The shim member 72b is disposed on the bottom surface 68b.

In the third embodiment, the shim members 72a and 72b of the first embodiment are used. However, this is not restricted, and the shim members 82a and 82b of the second embodiment may be used.

In the third embodiment, the heat insulating members 92a and 92b are respectively disposed in the recessed portions 66a and 66b of the insulators 18a and 18b. The heat insulating members 92a and 92b each include the first heat insulating members 94 and the second heat insulating members 96, which are made of different materials and which are alternately stacked on top of each other.

Therefore, interfacial thermal resistance is generated at the interface between the first heat insulating member 94 and the second heat insulating member 96, which are made of different materials, so that heat insulating property is effectively increased. Accordingly, even when the thicknesses of the first heat insulating member 94 and the second heat insulating member 96 are small, it is possible to obtain desired electrical conductivity and desired heat insulating property.

Moreover, the shim members 72a and 72b (or the shim members 82a and 82b) are respectively disposed in the recessed portions 66a and 66b. Thus, the effects the same as those of the first and second embodiments can be obtained with a simple structure. That is, for example, it is possible to apply an optimal surface pressure to each of the outer periphery and the power generation portion of the power generation cell 12.

Provided that the first heat insulating member 94 and the second heat insulating member 96 are made of different materials, the combination of the first and second insulating members 94 and 96 may be changed in various ways. The number of the first heat insulating members 94 and the number of the second heat insulating members 96 may be appropriately determined. The second heat insulating member 96 may have a corrugated shape, instead of a flat plate-like shape.

According to an aspect of the present disclosure, a fuel cell stack includes a stacked body in which a plurality of power generation cells, each including an electrolyte electrode assembly and a separator, are stacked in a stacking direction, the electrolyte electrode assembly including an electrolyte and a pair of electrodes sandwiching the electrolyte therebetween; and a terminal plate, an insulator, and an end plate that are disposed on each of two sides of the stacked body in the stacking direction.

In the fuel cell stack, each of the insulators includes a recessed portion that is open toward the stacked body; and a heat insulating member, a corresponding one of the terminal plates, and a shim member for thickness adjustment are disposed in the recessed portion.

It is preferable that the shim member be electrically insulating and be disposed on a bottom surface of the recessed portion.

It is preferable that the shim member be electrically conductive and be disposed at an end of the heat insulating member or in the heat insulating member.

In the fuel cell stack, the heat insulating members and the terminal plates are disposed in the recessed portions of the insulators. Therefore, with the aspect of the present disclosure, dissipation of heat from the outer peripheries of the heat insulating members and the terminal plates can be effectively suppressed. Therefore, it is possible to reliably suppress a decrease in the temperatures of end cells that are disposed at ends of the stacked body.

Moreover, the shim members for thickness adjustment are disposed in the recessed portions of the insulators. Accordingly, the tolerance of the steps of the insulators can be adjusted, and therefore it is possible to limit the heights of sealing members of the end cells to appropriate heights. Thus, the sealing members can be prevented from falling over or being compressed excessively, so that it is possible to obtain a desired sealability.

Therefore, with a simple structure, a decrease in the temperatures of end cells can be suppressed and thereby good power generation performance can be maintained; and it is possible to apply an optimal surface pressure to each of the outer periphery and a power generation portion of the power generation cell.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a stacked body in which a plurality of power generation cells are stacked in a stacking direction, each of the plurality of power generation cells including a separator and an electrolyte electrode assembly which includes an electrolyte and a pair of electrodes sandwiching the electrolyte therebetween, the stacked body having a first end portion and a second end portion opposite to the first end portion in the stacking direction;
insulators provided at the first end portion and the second end portion of the stacked body, respectively, each of the insulators having a recessed portion that faces toward the stacked body;
end plates provided on the insulators, respectively;
heat insulating members each provided in the recessed portion;
terminal plates each provided in the recessed portion; and
shim members each provided in the recessed portion for thickness adjustment.

2. The fuel cell stack according to claim 1,
wherein the shim members are electrically insulating and are each provided on a bottom surface of the recessed portion.

3. The fuel cell stack according to claim 1,
wherein the shim members are electrically conductive and are provided at ends of the heat insulating members or in the heat insulating members, respectively.

4. The fuel cell stack according to claim 1,
wherein the shim members are electrically conductive and are each provided between the separator and each of the heat insulating members.

5. The fuel cell stack according to claim 1,
wherein each of the heat insulating members comprises a first heat insulating member made of a first material and a second heat insulating member made of a second material different from the first material.

6. The fuel cell stack according to claim 5,
wherein the first heat insulating member and the second heat insulating member are alternately stacked on top of each other.

7. A fuel cell stack comprising:
a stacked body in which a plurality of power generation cells are stacked in a stacking direction, each of the plurality of power generation cells including a separator and an electrolyte electrode assembly which includes an electrolyte and a pair of electrodes sandwiching the electrolyte therebetween, the stacked body having an end portion;
an insulator provided at the end portion of the stacked body, the insulator having a recessed portion that faces toward the stacked body;
an end plate provided on the insulator;
a heat insulating member;
a terminal plate; and
a shim member for thickness adjustment,
wherein the heat insulating member, the terminal plate, and the shim member are disposed inside the recessed portion of the insulator.

8. The fuel cell stack according to claim 7,
wherein the shim member is electrically insulating and is provided on a bottom surface of the recessed portion.

9. The fuel cell stack according to claim 7,
wherein the shim member is electrically conductive and is provided at an end of the heat insulating member or in the heat insulating member.

10. The fuel cell stack according to claim 7,
wherein the shim member is electrically conductive and is provided between the separator and the heat insulating member.

11. The fuel cell stack according to claim 7,
wherein the heat insulating member comprises a first heat insulating member made of a first material and a second heat insulating member made of a second material different from the first material.

12. The fuel cell stack according to claim 11,
wherein the first heat insulating member and the second heat insulating member are alternately stacked on top of each other.

* * * * *